United States Patent
Gronau et al.

(10) Patent No.: US 6,312,066 B1
(45) Date of Patent: Nov. 6, 2001

(54) METHOD FOR IMPROVING THE REGULATION BEHAVIOR OF AN ABS SYSTEM IN OFF-THE-ROAD DRIVING

(75) Inventors: Ralph Gronau, Wetter; Gunther Buschmann, Idstein, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/101,551

(22) PCT Filed: Dec. 12, 1996

(86) PCT No.: PCT/EP96/05557

§ 371 Date: Jul. 23, 1999

§ 102(e) Date: Jul. 23, 1999

(87) PCT Pub. No.: WO97/26164

PCT Pub. Date: Jul. 24, 1997

(30) Foreign Application Priority Data

Jan. 17, 1996 (DE) ................................. 196 01 529

(51) Int. Cl.[7] ............... B60T 8/00; B60T 8/32; B60T 8/60; B60T 8/70
(52) U.S. Cl. ................ 303/196; 303/176; 303/195
(58) Field of Search .................... 303/196, 195, 303/143, 157, 177, 176, 190; 701/70, 71, 75, 79, 78, 81; 180/197, 244

(56) References Cited

U.S. PATENT DOCUMENTS 5,253,931 * 10/1993 Köster et al. ................... 303/176

FOREIGN PATENT DOCUMENTS

| 2758529 | 8/1979 | (DE) . |
| 3421253 | 12/1984 | (DE) . |
| 425810 | 8/1991 | (DE) . |
| 4028193 | 2/1992 | (DE) . |
| 475010 | 3/1992 | (DE) . |
| 4027785 | 5/1992 | (DE) . |
| 4340442 | 1/1995 | (DE) . |
| 2565169 | 6/1985 | (FR) . |
| 2565181 | 12/1985 | (FR) . |
| 97/26164 | 7/1997 | (WO) . |

OTHER PUBLICATIONS

Search Report of the German Patent Office Relating to Parent German Patent Application No. 19601529.4, filed May 8, 1996.

Automatic Locking Differential, Electronic Traction Control and 4MATIC: Three Systems in Daimler–Benz' "Active Safety Concept"—Part 1,*ATZ Automobilitechnis-cheZeitschrift 88* (*1986*).

English translation of the International Preliminary Examination Report for PCT/EP96/05557.

* cited by examiner

*Primary Examiner*—Douglas C. Butler
(74) *Attorney, Agent, or Firm*—Rader, Fishman & Grauer PLLC

(57) ABSTRACT

To improve the control behavior of an ABS system in an off-road travel situation, a special control mode is activated as soon as such an off-road travel situation is identified. To this end, braking pressure reduction on the wheel of a vehicle axle which is the first to exceed the normal control thresholds is prevented, different from the normal control mode, and the braking pressure on this wheel is maintained constant until reacceleration of this wheel commences. Starting from this time, braking pressure increase is allowed in the wheel brake of this wheel until the normal control thresholds are reached and the special control mode is terminated. The normal control mode applies to the second wheel of the axle concerned as long as the special control mode applies to the first wheel. Subsequently, the special control mode can pass on to the second wheel of the axle, and the first wheel will then ensure that steerability and/or driving stability is maintained.

7 Claims, 2 Drawing Sheets

METHOD FOR IMPROVING THE REGULATION BEHAVIOR OF AN ABS SYSTEM IN OFF-THE-ROAD DRIVING

TECHNICAL FIELD

The present invention relates ABS control, and more particularly relates to improved ABS control in rough road conditions.

BACKGROUND OF THE INVENTION

Anti-lock control systems are part of the standard equipment in medium-class and upper-class vehicles. Lower-category and low-cost cars are increasingly included in this group. The advantages of anti-lock control are beyond doubt, although there are exceptional situations where the stopping distance may become longer caused by anti-lock control operations than in braking operations where the wheels lock.

Such exceptional driving situations are especially important for off-road travel conditions or off-road vehicles having a braking performance on gravel, broken stones and similar pavements. There is a relatively frequent braking control of a locked wheel on such road pavements, with the result that anti-lock control may cause an extended stopping distance. Therefore, it has been known in the art to provide a possibility of deactivating the anti-lock control system in off-road vehicles in order to ensure maximum possible deceleration during off-road travel.

Such a deactivation is of course critical because faulty operation is imminent. Also, when both front wheels lock, the vehicle cannot be steered. When the rear wheels lock, driving stability is known to be jeopardized.

Further, it is known in the art to activate a special control mode in off-road vehicles during off-road driving which allows anti-lock control operations for the second wheel of an axle only after the respective first wheel of the axle has locked.

Therefore, an object of the present invention is to develop a method of improving the control behavior of an anti-lock control system in off road travel situations which has favorable effects on the stopping distance in such a situation and on steerability and driving stability.

The special feature of the method of the present invention is that in the special control mode in the wheel brake of the wheel which is the first to exceed the predetermined normal control thresholds, different from the normal control mode, braking pressure reduction is prevented and the braking pressure on this wheel is maintained constant until reacceleration of this wheel commences. Upon reacceleration of the wheel, braking pressure increase is permitted, and the special control mode for this wheel is terminated when the normal control thresholds are reached. Further, it is ensured that the special control is principally allowed for only one wheel of an axle at a time, and the normal control mode applies to the other wheel of the axle.

In a preferred embodiment, the existence of brake slip and a rising or constant wheel deceleration are predetermined as necessary conditions for the activation of the special control after entry of a wheel into normal control or after the normal control thresholds have been exceeded. These two conditions must be satisfied for the commencement of the special control on the wheel at issue.

Maintaining driving stability and steerability has basically priority at high vehicle speeds. Therefore, in another embodiment of the present invention, the special control mode is admitted only at a vehicle speed or vehicle reference speed which is below a predetermined limit value. It is also possible to principally trigger the special control mode when the speed is below the limit value, however, to prevent it at higher speeds.

The existence of an off-road travel situation is automatically 'identified' in a favorable aspect of the present invention by evaluating chassis vibrations, wheel vibrations, etc., which are typical of off-road travel. On the other hand, it is also possible to provide a switch in the vehicle which can be operated manually in order to signal an off-road travel situation to the control system and thereby allow the special control mode.

DETAILED DESCRIPTION OF THE PREFERRED EMBODIMENTS

Figure 1:
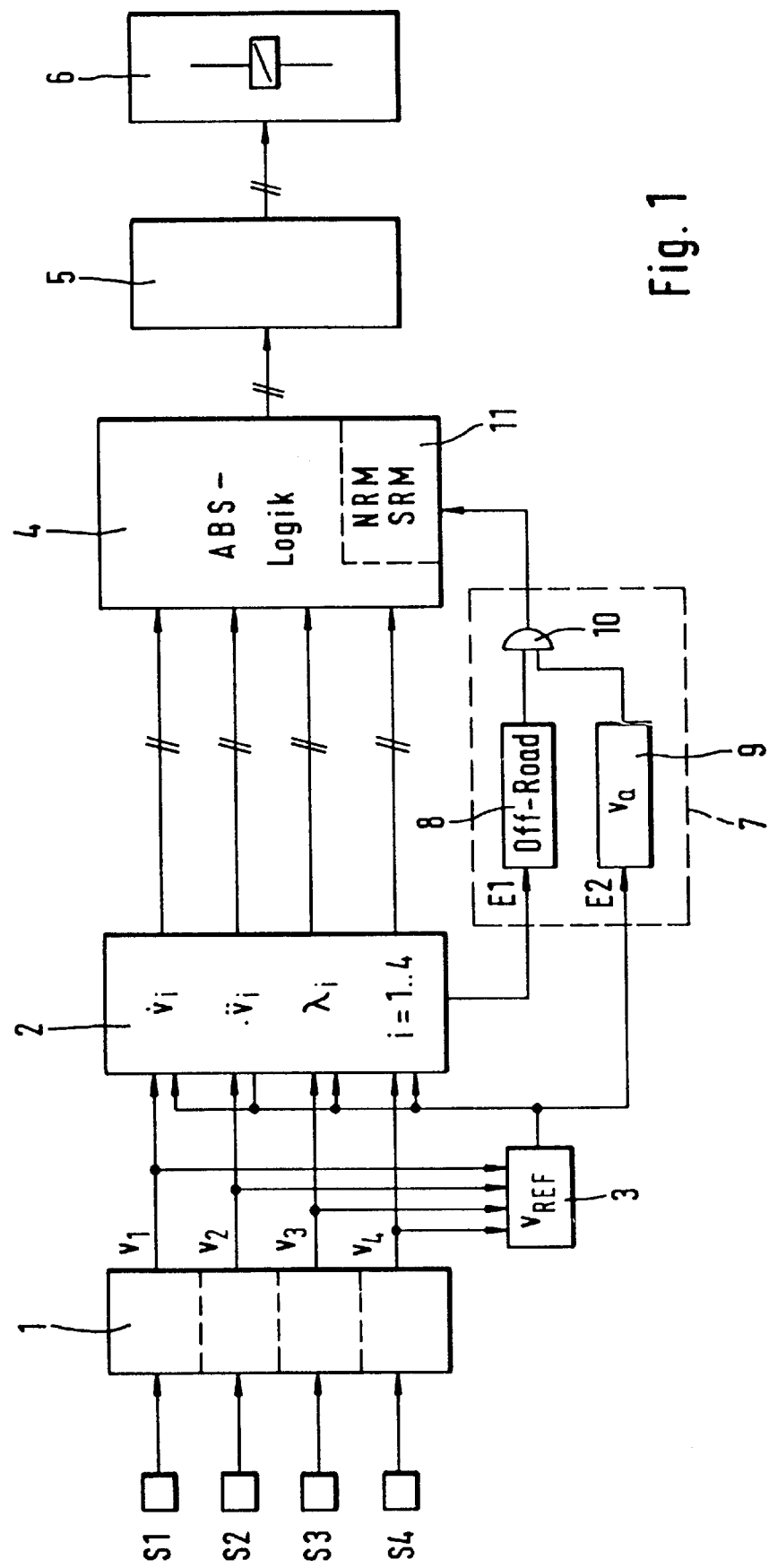
FIG. 1 is a wiring diagram or flow chart of the essential electronic components of a circuit for implementing the method of the present invention.

The circuit of the FIG. 1 embodiment is intended for use for anti-lock control in off-road vehicles. The most important input quantity of the control system is the wheel rotational behavior which is measured by wheel sensors S1 to S4. Signals or data representative of the speeds V1 to V4 in the individual vehicle wheels and the rotational behavior of the wheels are derived from the sensor signals in a conditioning circuit 1.

The speed signals V1 to V4 are calculated in an evaluating circuit 2. Above all, the variations of the vehicle speeds, i.e., the wheel decelerations and accelerations V1 to V4, the time variations of these quantities, the so-called jerk, and the wheel slip 11 to 14 are of interest.

Typically, a vehicle reference speed VREF which is produced by logically combining the individual wheel speeds V1 to V4 and approximately represents the vehicle speed is taken into account to calculate the wheel slip.

In a circuit 4 represented as ABS logic unit, braking pressure control signals are produced by data processing on the basis of complex algorithms and by evaluation of all available data from the values measured on each individual wheel and the derived quantities (deceleration, acceleration, jerk, slip, reference speed, etc.). The braking pressure control signals are sent to a controlling block 6 by way of a valve actuation control 5. The controlling block includes braking pressure actuators, for example, electromagnetically controllable hydraulic valves. In prior art anti-lock control systems, each vehicle wheel has an electromagnetically controllable inlet valve and outlet valve. These valves or valve pairs in conjunction with a low-pressure supply system or a hydraulic return pump are used to adjust the braking pressure in the wheel brakes of the individual vehicle wheels to the value calculated by the control system as a function of the wheel rotational behavior.

An ABS circuit system of the type illustrated may of course also be realized by programmed circuits, such as microcomputers, microcontrollers or similar elements. This solution is even preferred nowadays.

The circuitry shown further includes an additional circuit 7 comprising elements or circuits or representing program steps necessary to implement the method of the present invention. The additional circuit 7 is mainly composed of two identification circuits 8 and 9 and an AND-operation 10. Circuit 8 identifies and signals an off-road travel situation, i.e., driving on bumpy road surfaces, on gravel, broken stones, or similar pavements. To identify such road surface situations or off-road travel, appropriately (as in this case), the wheel signals sent by the wheel sensors and calculated in the evaluating circuit 2 are analyzed. Off-road driving causes a typical wheel rotational behavior, torsional vibrations of the wheels, chassis vibrations of a defined amplitude or frequency, or the like. The typical signal course depends on the respective chassis construction.

An input E1 of the additional circuit 7 or the identification circuit 8 can be connected alternatively or additionally to a (non-illustrated) manually operable switch by means of which 'off-road travel' can be signalled to the identification circuit 8.

The second identification circuit 9 of the additional circuit 7, having an input referred to as E2, compares the instantaneous vehicle reference speed $V_{REF}$ with a predetermined vehicle speed threshold $V_G$. When the vehicle reference speed $V_{REF}$ is below the predetermined speed limit value $V_G$ and 'off-road travel' is identified by circuit 8, this condition is signalled to the ABS logic unit 4 by way of the AND-operation 10. 'Switch-over' to the special control mode is subsequently performed by a part 11 (shown in dotted lines) of the ABS logic unit 4, when the above-mentioned criteria are satisfied which will be explained hereinbelow by way of FIG. 2. After the activation of this special control mode, pressure reduction or anti-lock control on one wheel is not allowed until the second wheel of the respective axle locks.

A value in the order of between 15 km/h and 25 km/h, for example, a limit value of roughly 20 km/h, ha s been found to be suitable as a limit speed $V_G$, in excess of which a special control mode is not allowed or is terminated. Unimpeded anti-lock control with optimum steerability and driving stability has priority at high vehicle (reference) speeds, i.e., generally in the absence of 'off-road travel'.

Figure 2:
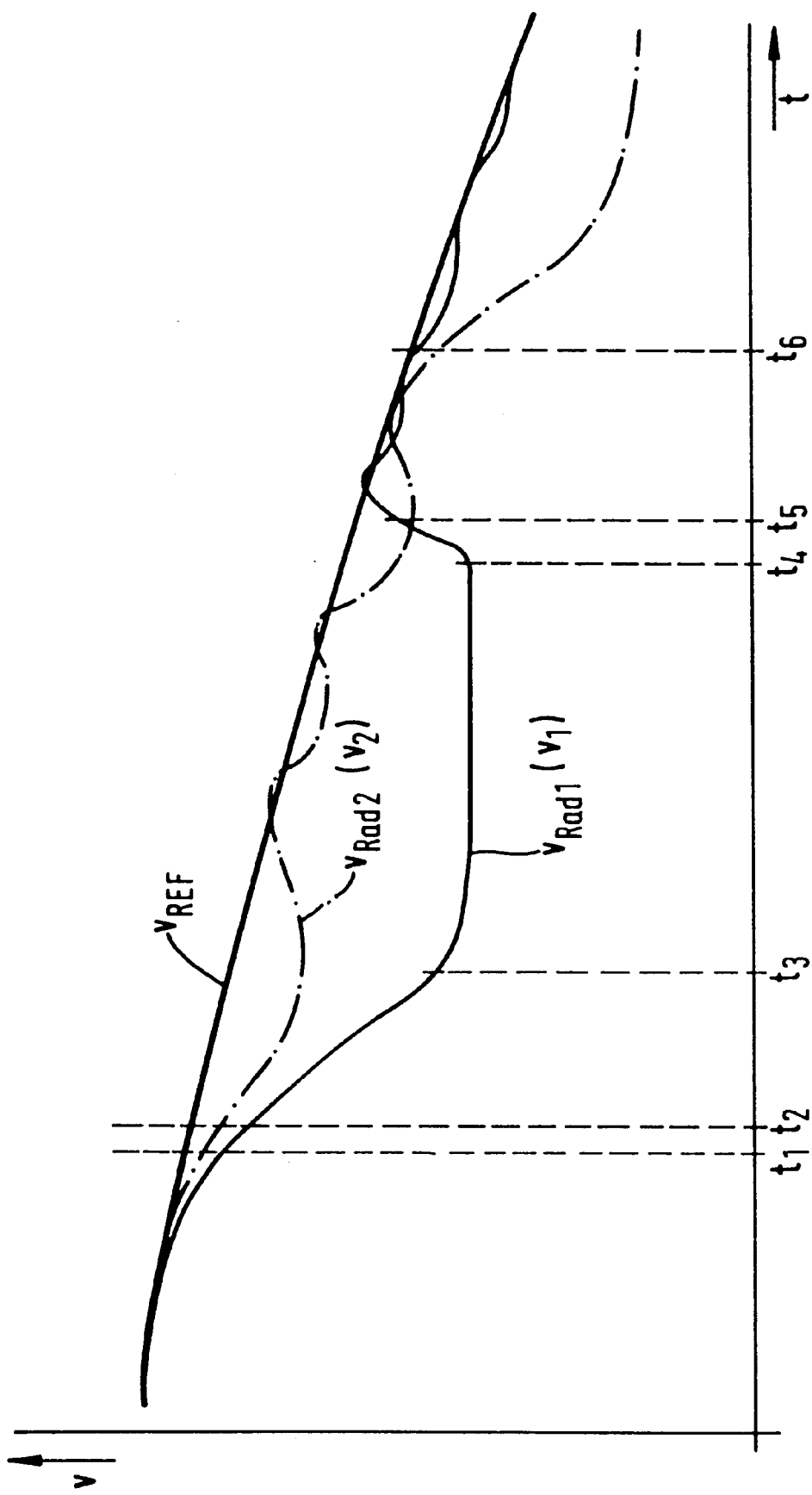
FIG. 2 is a diagram of the speed variation of the vehicle and the two wheels of an axle in a situation where the method of the present invention influences the control.

FIG. 2 shows an example of the control intervention according to the present invention in an off-road driving situation. $V_{Rad1}$ and $V_{Rad2}$ refers to the speed variation of the two wheels of an axle. $V_{REF}$ is the vehicle reference speed in the braking operation at issue. $V_{Rad1}$, $V_{Rad2}$ is identical with the speed $V_1$ or $V_2$ in the FIG. 1 embodiment.

The decreasing vehicle reference speed $V_{REF}$ indicates that part of the braking operation is concerned. In the control operation in review, the control commences at time t1 because the overbraked wheel $V_{Rad1}$ exceeds the predetermined normal control thresholds at this moment. For example, the deceleration of the vehicle wheel 'Rad1' exceeds a predetermined deceleration threshold at time t1. The second wheel 'Rad2' enters the control slightly late.-, i.e., at the time t2.

Thus, the wheel Rad1 was the first to exceed the normal control threshold. The conditions are satisfied: Rad1 is subjected to slip and signals increasing or constant wheel deceleration. Further, the vehicle is off-road or in an off-road travel situation. The vehicle speed or vehicle reference speed is below the speed limit value $V_G$. The additional circuit 7 of FIG. 1 signals off-road operation to the ABS logic 4 or to the circuit part or program part 11 of the logic 4 responsible for the special control. Therefore, the braking pressure in the wheel brake of the wheel 1 is exposed to the special control mode. Different from the normal control or the normal control mode, braking pressure reduction in the wheel brake of wheel 1 is prevented following t1 so that this wheel (as shown in FIG. 2), or the brake slip and the deceleration of this wheel continue to increase. A normal anti-lock control operation is effected on the second wheel of the same vehicle axle—wheel course $V_{Rad2}$.

The tendency of the wheel course $V_{Rad1}$ changes due to a rise in the coefficient of friction at time t3 approximately. Wheel deceleration decreases until reacceleration of the wheel Rad1 commences at time t4. As soon as reacceleration or acceleration >0 g is determined, the braking pressure in the wheel brake of the wheel at issue is increased due to the special control mode so that a normal control threshold is reached and exceeded roughly at time t5 in the embodiment shown. Subsequently, the special control for Rad1 is terminated so that the normal control mode applies again to this wheel (Rad1) commencing t5.

According to the present invention, only one wheel of an axle is basically admitted to the special control mode at a time, and the normal control mode applies to the other wheel. Only after time t5, i.e., after termination of the special control mode for Rad1, will it be possible for the second wheel of the axle to undergo the special control mode, provided the entry conditions are satisfied. This situation occurs at time t6 in the braking operation shown in FIG. 2. It can be seen from the curve variation of the dotted speed curve $V_{Rad2}$ of the wheel 2 that the special control mode now applies to this wheel. As described hereinabove, braking pressure reduction in the wheel brake of wheel 2 is prevented starting from time t2, however, Rad1 is subjected to the normal control mode. The special control mode has so-to-speak passed from Rad1 to Rad2, while the task of ensuring steerability and/or driving stability was transmitted from Rad2 to Rad1.

After time t5, it principally applies as well as before time t1 that the wheel which is the first to exceed the normal control thresholds will undergo the special control mode and the other wheel of the same axle is subjected to the normal control mode.

During off-road travel or in an off-road situation, it is achieved by the control method of the present invention that brake performance (compared to normal control under the following conditions) is considerably improved and steerability and driving stability are maintained by a selective locking of one wheel of an axle and by continuing anti-lock control on the second wheel of the respective axle. Wheel lock or entry into a condition with a relatively great amount of brake slip is limited by monitoring the deceleration variation in order to revert from the special control mode to the normal control mode for the wheel concerned in due time or as early as possible. As soon as the deceleration of the 'locking' wheel decreases and reacceleration occurs, it is assumed that this wheel has now become the wheel having the higher coefficient of friction. Therefore, the special control mode is passed on to the other wheel of the same axle in the fashion described. This action may alternate repeatedly which, in total, results in a greatly improved control behavior during off-road travel and permits continuing slip control (even though with limitations) under such off-road conditions.

What is claimed is:

1. Method of improving a control behavior of an anti-lock control system (ABS) under rough road conditions, said ABS system effective for measuring and evaluating a rotational behavior of each wheel of a wheeled vehicle to determine input quantities for anti-lock control operations, said method including the steps of:

detecting a rough road condition, in initiating a special control mode, wherein said special control mode includes, monitoring a plurality of wheel brakes, and determining which of said wheel brakes is a first to exceed the predetermined normal control thresholds, preventing braking pressure reduction and maintaining constant braking pressure until reacceleration of this wheel commences, in that upon reacceleration of this wheel braking pressure increase is permitted, and terminating the special control mode for this wheel when the normal control thresholds are reached, and in that the special control is allowed for only one wheel of an axle at a time, and the normal control mode applies to all other wheels of the axle.

2. Method as claimed in claim 1, wherein the presence of brake slip is less than or equal to 100% and a rising or constant wheel deceleration are necessary conditions for the special control after entry of a wheel into normal control or after the normal control thresholds have been exceeded.

3. Method as claimed in claim 1, wherein entering the special control mode is permitted only at a vehicle speed or vehicle reference speed which is below a predetermined limit value.

4. Method as claimed in claim 3, wherein a speed between 15 km/h to 25 km/h is p redetermined as a limit value of the vehicle speed or vehicle reference speed.

5. Method as claimed in claim 1, further including identifying the existence of an off-road travel situation by evaluating at least one of the following: chassis vibrations, wheel vibrations, wheel rotation vibrations.

6. Method as claimed in claim 1, further including signaling the existence of an off-road travel situation to the control system by manual operation of a switch.

7. Method as claimed in claim 1, further including allowing the special control mode at a vehicle speed which is below a predetermined speed limit value.

* * * * *

UNITED STATES PATENT AND TRADEMARK OFFICE
CERTIFICATE OF CORRECTION

PATENT NO.     : 6,312,066 B1
DATED          : November 6, 2001
INVENTOR(S)    : Ralph Gronau and Gunther Buschmann It is certified that error appears in the above-identified patent and that said Letters Patent is hereby corrected as shown below:

<u>Column 6,</u>
Line 6, change "is p redetermined" to -- is predetermined --.

Signed and Sealed this

First Day of October, 2002

Attest:

Attesting Officer

JAMES E. ROGAN
*Director of the United States Patent and Trademark Office*